(12) United States Patent
Gruen et al.

(10) Patent No.: US 7,406,455 B1
(45) Date of Patent: Jul. 29, 2008

(54) AUTOMATIC RECOGNITION AND FLAGGING OF ANOMALOUS ITEMS WITHIN SETS OF AUTOMATICALLY CLASSIFIED ITEMS

(75) Inventors: Daniel M. Gruen, Newton, MA (US); Paul B. Moody, Hyde Park, VT (US); Steven L. Rohall, Winchester, MA (US); Seymour Kellerman, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 10/051,450

(22) Filed: Jan. 17, 2002

(51) Int. Cl.
*G06F 17/00* (2006.01)
*G06N 5/00* (2006.01)

(52) U.S. Cl. .................. 706/47; 706/46; 706/45; 717/117

(58) Field of Classification Search .................. 706/47, 706/46, 45; 717/117
See application file for complete search history.

(56) References Cited

U.S. PATENT DOCUMENTS

| | | | | |
|---|---|---|---|---|
| 5,377,354 A | * | 12/1994 | Scannell et al. ............. | 718/103 |
| 6,012,051 A | * | 1/2000 | Sammon et al. ............. | 706/52 |
| 6,057,841 A | * | 5/2000 | Thurlow et al. ............. | 715/809 |
| 6,094,651 A | * | 7/2000 | Agrawal et al. ............. | 707/5 |
| 6,336,109 B2 | * | 1/2002 | Howard ...................... | 706/25 |
| 6,553,383 B1 | * | 4/2003 | Martin ....................... | 707/102 |
| 6,567,796 B1 | * | 5/2003 | Yost et al. .................. | 707/2 |
| 6,647,379 B2 | * | 11/2003 | Howard et al. ............. | 706/25 |

* cited by examiner

Primary Examiner—Joseph P. Hirl
Assistant Examiner—Adrian L Kennedy
(74) Attorney, Agent, or Firm—Seth H. Ostrow; Dreier LLP

(57) ABSTRACT

The present invention comprises a method and software for recognizing and flagging a data item used by one or more application program as falling within the scope of a rule but anomalous when compared with other data items falling within the scope of the rule. The method of the present invention comprises determining a collection to which the data item belongs as defined by the rule. The collection that the data item belongs to is analyzed to calculate statistics regarding the other data items that are part of the collection. Based on the statistical calculations, it is determined whether the data item is an anomalous data item. If the data item is identified as an anomalous data item, it is flagged.

19 Claims, 5 Drawing Sheets

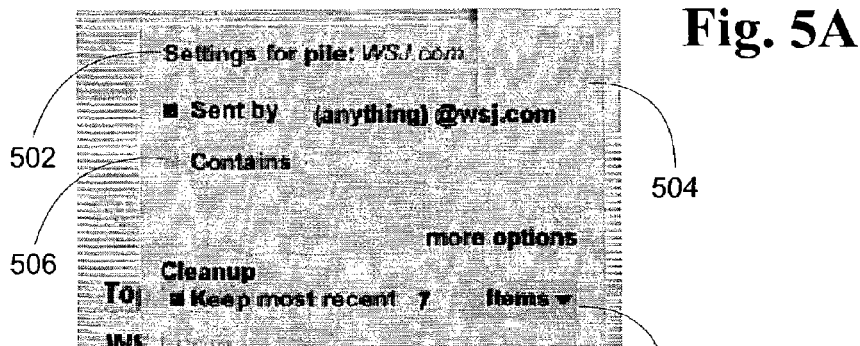

Fig. 5A

Sample of a rule describing which new mail messages should be added to a collection. (Here, all messages arriving from domain "wsj.com")

Fig. 5B

An icon representing the collection when nothing new has been added.

Fig. 5C

An icon representing the collection when a regular (e.g., unexceptional) new message has been added.

Fig. 5D

An icon representing the collection notifying the user that a message that has been added is not like the others; although it does match the rule, it differs from the other messages in the collection, e.g., an anomalous data item

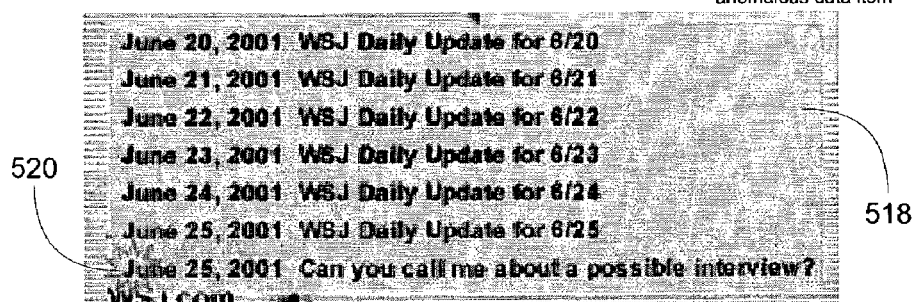

A view showing the contents in the collection, showing the anomalous message flagged at the bottom.

Fig. 5E

AUTOMATIC RECOGNITION AND FLAGGING OF ANOMALOUS ITEMS WITHIN SETS OF AUTOMATICALLY CLASSIFIED ITEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to classification and organization of data items in computer systems. More particularly, the present invention relates to methods and software for recognizing items that satisfy rigid general rules for organizing information, but differ from other items that also satisfy the rules, thereby requiring a user or supervising software process to be notified.

With the rise of networks of digital computers, staggering amounts of information are passed between individuals and computer systems on a daily basis. Whether through email (SMTP), the World Wide Web (HTTP), file transfer (FTP), or data exchanges (EDI), it is clear that the interchange of information has come to define modern existence. Because of this vast information exchange, between individuals and software systems, there are many situations in which rules are created to categorize, filter, or handle data items in an unsupervised fashion.

A common application of a rules system to automate the handling of data items is in electronic mail client applications. Using an electronic mail client application, functionality is provided to establish rules so that incoming mail comprising a specific set of attributes is routed to a desired location, such as a directory on a file system or another user on a network. For example, a user may define a rule specifying that all electronic mail received from the user "John.Doe@anydomain.com" should be routed to an electronic mailbox labeled "John.Doe". Similarly, complex rules may be defined that include instructing the mail client to perform processing defined by the user on specific electronic mail messages.

There are many situations, however, where a rigid rules based system is not adequate to correctly handle or route every data item received, even data items that fall within the scope of a defined rule. This shortcoming of a rigid rules based system is essentially "over generalization", that is, catching items that conform to rigid rules, but which the user would not wish to have grouped with other items that satisfy the rule. Over generalization can cause important items to be overlooked or handled in unintended ways. This effect stems from the fact that users may create overly broad rules and because they cannot always anticipate the variety of potential items that may arrive in the future.

In order to overcome the mishandling of received data items that fall within the scope of rigid rules, a user or system is required define a multiplicity of narrowly targeted rules in an attempt to predict every type of data item that is expected to be received in the future. This technique is undesirable for many reasons. First, as with over generalization, it is nearly impossible to identify and create a rule to handle every data item that is to be received by a user or system; some data items inevitably are mishandled due to unidentified exceptions to a rule that are not recognized in advance. Another reason this technique is undesirable is the amount of time required to create a rule to handle every data item expected to be received, in addition to creating exceptions to the rules. Indeed, one would need to be able to divine the future to anticipate every exception to every rule created.

There is thus a need for a system and method for automatically recognizing and flagging extraordinary or exceptional data items that nonetheless satisfy a rigid rule. Flagging these extraordinary or exceptional data items that meet the criteria defined by a rigid rule ensures that these data items requiring the attention of a user or software process are not overlooked or handled in unintended ways.

BRIEF SUMMARY OF THE INVENTION

The present invention comprises a method and software for recognizing and flagging a data item used by one or more application programs as an anomalous data item. The method of the present invention comprises determining a collection to which a data item belongs as defined by a rule. The collection that the data item belongs to is analyzed to calculate statistics regarding other data items that are part of the collection. Based on the statistical calculations, it is determined whether the data item is an anomalous data item. If the data item is identified as an anomalous item, it is flagged. Generally speaking, an anomalous data item is a data item that falls within the scope defined by a rule, but differs from other data items that fall within the scope defined by the rule such that it is advantageous to bring the anomalous data item to the attention of the user or supervising software process.

The step of calculating comprises may comprise calculating the mean data item size and standard deviation for the other data items in the collection; calculating the mean interval between data items and standard deviation for the other data items in the collection; and calculating the mean data item arrival time and standard deviation for the other data items in the collection. Additionally, the step of calculating may comprise calculating the presence or absence of keywords for other data items in the collection. According to this embodiment, the data item is identified as an anomalous data item based on the presence or absence of keywords.

Statistics for other data items in the collection may be calculated in real time or periodically. The step of identifying whether the data item is an anomalous data item may comprise determining whether the data item falls outside a number of standard deviations from the statistical calculations. The method of the present invention may be embodied in computer readable media comprising program code, the program code instructing a programmable microprocessor to execute a method as described above for recognizing and flagging a data item used by one or more application programs as an anomalous data item.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIGS. 5a through 5e are a series of screen diagrams presenting user interface cues to flag an anomalous data item and alter a user according to one embodiment of the present invention.

DETAILED DESCRIPTION OF THE PREFERRED EMBODIMENTS

Figure 1:
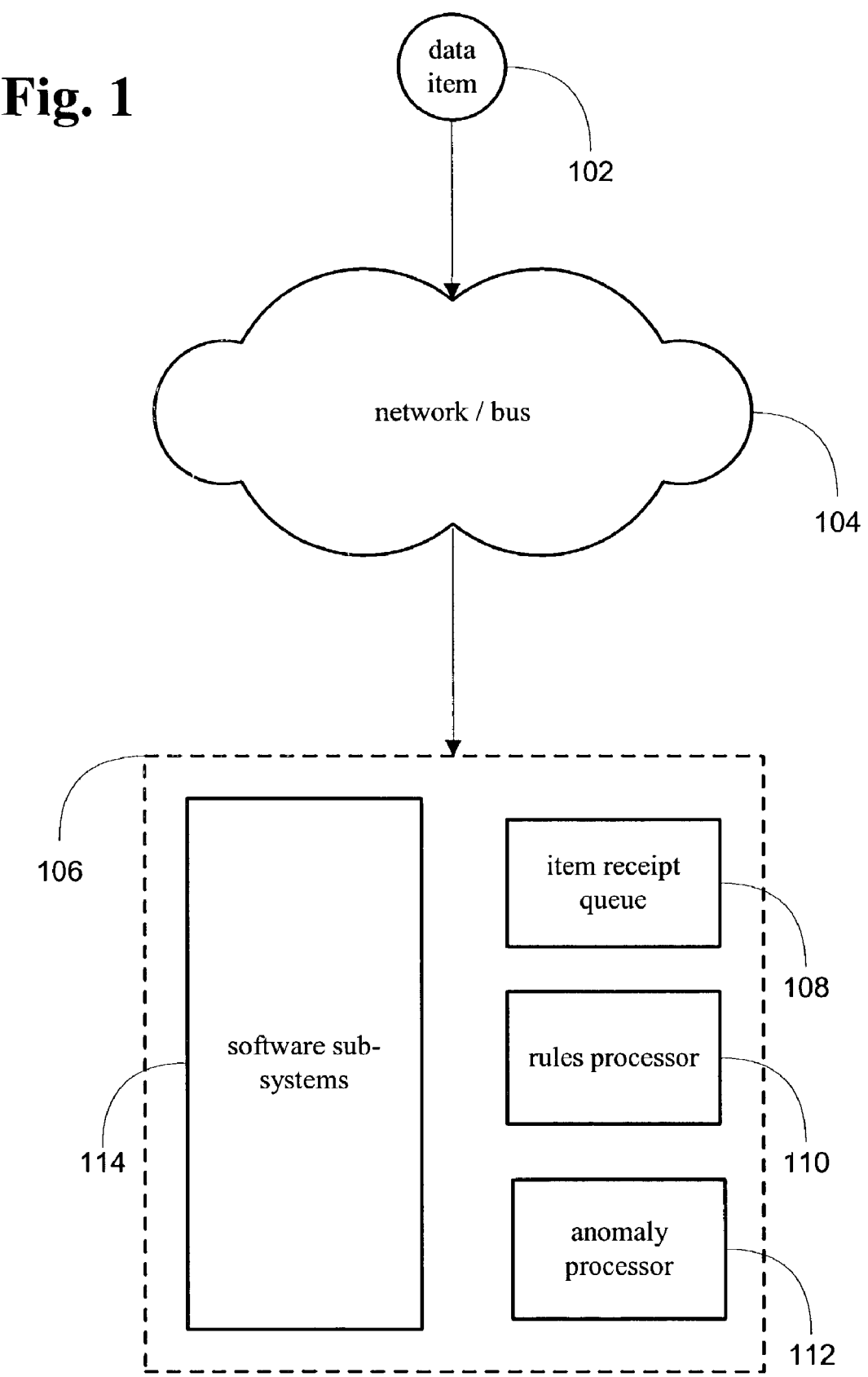
FIG. 1 is a block diagram of hardware and software components for recognizing and flagging anomalous data items, according to one embodiment of the present invention.

With reference to FIGS. 1 through 5e, preferred embodiments of the present invention are presented. A data item 102 may comprise any discrete piece of data, such as an electronic mail message, an instant message, a data file, or even a pointer to an address in a computer's persistent or transient memory. As is apparent to those skilled in the art, a data item may indeed comprise any piece of data that a computer is capable of interpreting, e.g., binary data.

Depending on the environment that the invention is being deployed, e.g., within an individual computer or between computers interconnected by a network such as the Internet, the data item 102 may be routed along a network or bus 104. Where the invention is deployed within an individual computer in order to recognize and flag anomalous data items, the data item is passed along the computer's bus 104. The bus is the data path on the computer's motherboard that interconnects the microprocessor with attachments to the motherboard, such as Random Access Memory (RAM), hard disk drives, removable disks, graphics adapters, etc. Where the invention is deployed within a networked computing environment, the network 104 is the bridge between the various computers comprising the network that is used to carry the data item to an intended destination for processing.

Data items 102 are routed along a network or bus to arrive at their intended destination 106. The destination system 106 is comprised of a number of components, which may be embodied in hardware or software depending on the specific environment in which the invention is deployed, including an item receipt queue 108, a rules processor 110, an anomaly processor 112, and various software subsystems 114. According to one embodiment of the invention, the system 106 is a microprocessor and associated memory structures wherein each of the components 108, 110, 112, 114 are software processes executed by the microprocessor 106. According to alternative embodiments, the system 106 is an individual computer connected to a network 104 wherein each of the components 108, 110, 112, 114 are software processes executed by the computer 106.

Regardless of whether the elements represented at 104 and 106 are a bus and microprocessor or a network and computer, data items 102 are transmitted across the network/bus 104 and received by the item receipt queue 108. The item receipt queue 108 is a queue to hold recently received data items 102 that are waiting for processing. As data items 102 are added to the item receipt queue 108, they are removed for processing by the rules processor 110. According to alternative embodiments, the item receipt queue 108 may be eliminated whereby data items 102 are delivered directly to the rules processor 110 for analysis.

The rules processor 110 analyzes received data items to determine if an item falls within the scope defined by a rule. Additionally, the rules processor 110 may provide both a programmatic and visual interface that allows a user to define rules to process received data items. Rules defined through use of the rules processor 110 may be tailored to the type of data items received in the environment in which the invention is deployed. For example, where the rules processor is operating in an electronic mail system, a user defines rules relating to the properties of the received data items, in this instance electronic mail messages, and actions that are associated with the rule. An exemplary rule in an electronic mail system would be to identify all messages received from the domain WSJ.com and store it in a directory on a local filesystem named "WSJ". More complex rules may also be created including rules that pass received data items off as input other software processes, e.g., initiating automated processing systems upon receipt of the data item that is within the scope defined by the rule.

As previously explained, rigid rules tend to be incapable of ideally handing each data item that comes within the scope of the rule, e.g., these rigid rules are incapable of recognizing anomalous data items and properly handling them. In order to properly identify and flag anomalous data items, an anomaly processor is provided 112. The anomaly processor 112, like the rules processor 110, may be tailored to work with specific types of data items depending on the environment in which the invention is deployed.

As will be explained in greater detail herein, the anomaly processor 112 analyzes all previously received data items that have fallen within the scope of the defined rule in order to generate statistics regarding the set of data items that satisfy the rule. Where a data item is different according to some statistically significant manner, the data item is flagged as an anomaly and brought to the attention of the user or controlling software process, e.g., software sub-systems 114. According to some embodiments, the anomaly processor flags data items as anomalous only after a threshold number of data items are contained in the collection defined by the scope of the rule. This threshold may be set dynamically by the user, administrator, or even the developer who embodies the invention in a software application.

Figure 2:
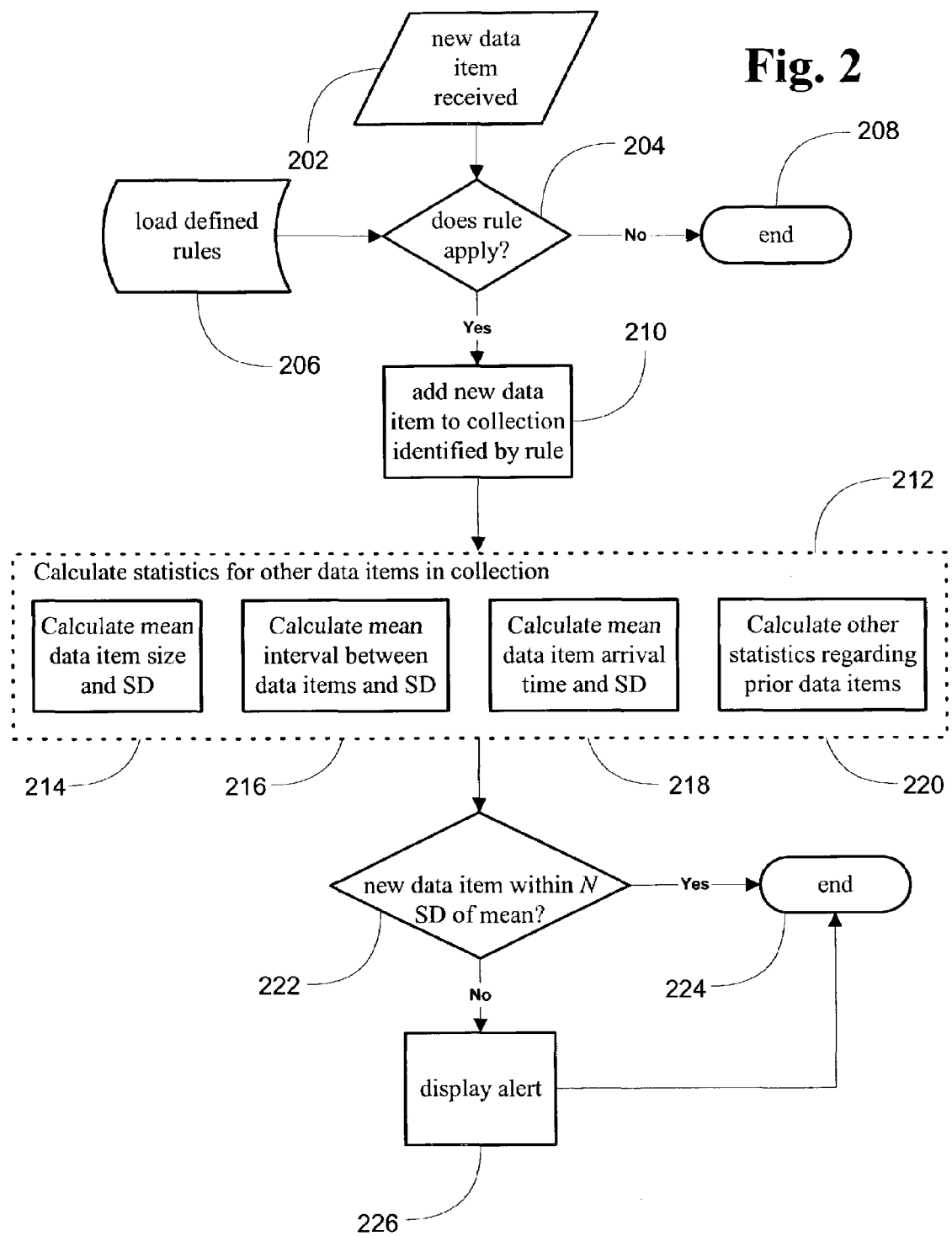
FIG. 2 is a flow diagram presenting a process of recognizing and flagging anomalous data items, according to one embodiment of the present invention.
Figure 3:
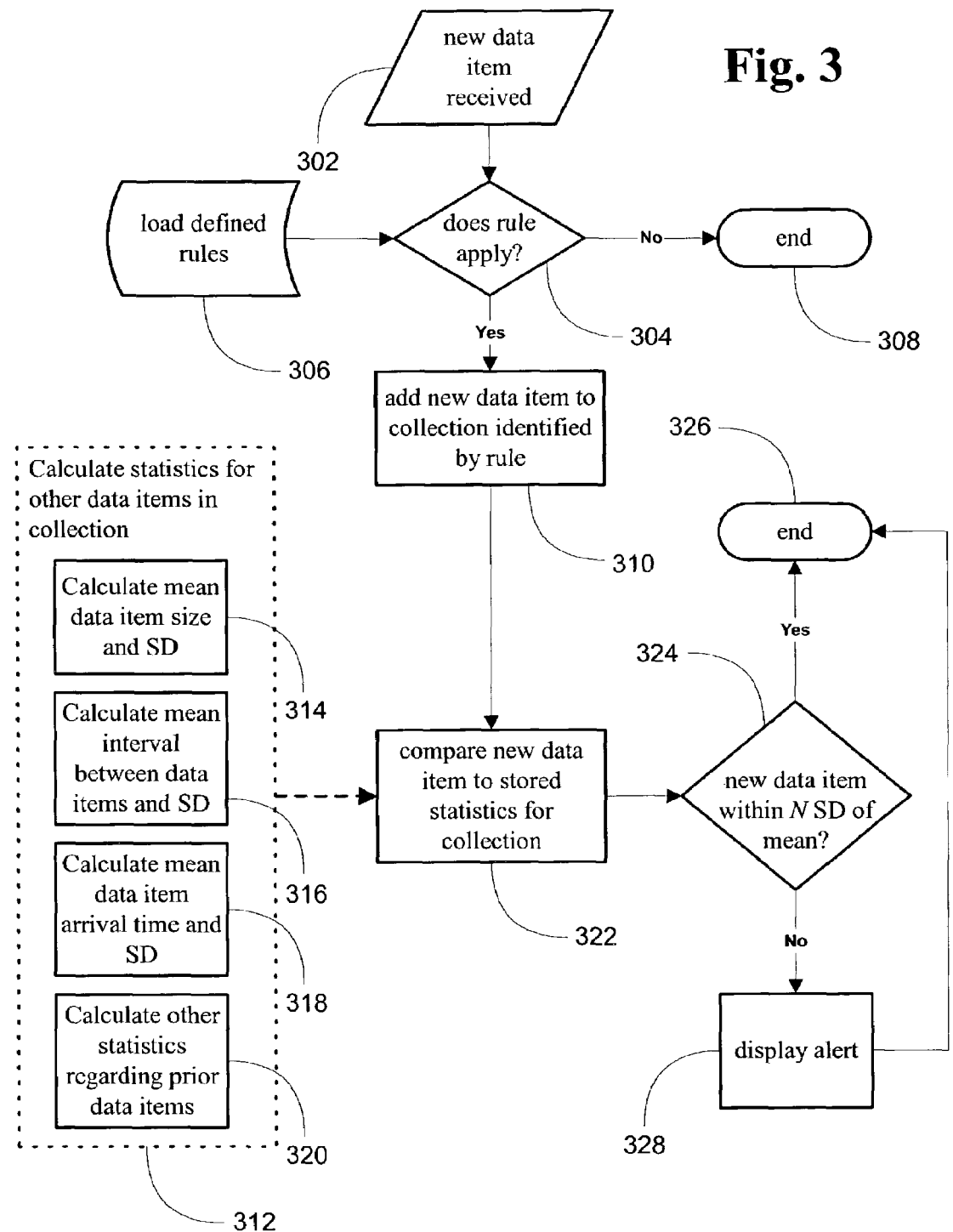
FIG. 3 is an alternative flow diagram presenting a process of recognizing and flagging anomalous data items, according to one embodiment of the present invention.

FIGS. 2 and 3 contain alternative flow diagrams presenting methods of operating the system presented in FIG. 1 for automatically recognizing and flagging anomalous data items. FIG. 2 presents a flow diagram of the process of recognizing and flagging anomalous data items as new data items are received, e.g., in real time. The process begins when a new data item is received, step 202. The system also loads the rules that have been defined to process received data items, step 206. Based on the defined rules that have been retrieved and loaded by the system, a check is performed to determine whether the received data item falls within the scope of one of the rules, step 204. Where no rule is identified with sufficient scope to include the received data item, step 204, no action is taken on the data item, step 208. If a the new data item falls within the scope of a defined rule, the new data item is added or routed to the collection identified by the rule, step 210.

The appropriate rule is identified, step 204, and the new data item added to the collection defined by the selected rule, step 210. As used herein, the term collection broadly refers to a group of data items that have previously been identified as falling within the scope defined by a rule. The system calculates statistics for previous data items that have been placed in the collection in order to determine if the new data item added to the selection is an anomalous data item and should therefore be flagged, step 212. Statistical techniques well known to those skilled in the art are used to calculate the mean and standard deviation for a variety of values with regard to previous data items that have been added to the collection, steps 214, 216, 218, and 220.

The system calculates the mean data item size for the previous data items that have been added to the collection as well as the standard deviation, step 214. The system calculates the mean interval between data items as well as the standard deviation, step 216. The system also calculates the mean data item arrival time and standard deviation for previous data items in the collection, step 218. The system may also calculate other statistics regarding the data items previously in the collection, depending on the type of the data item being analyzed, step 220. These calculations, steps 214, 216, 218, and 220, are preferably performed in parallel in order to increase efficiency and decrease the response time of the system in identifying anomalous data items.

As indicated by step 220, the process of calculating statistics should not be construed as limited by the specific calculations disclosed by the present embodiment of operation. Rather, as one skilled in the art recognizes, the appropriate statistics vary in accordance with the particular type of data item being handled. For example, according to some embodiments, it may be advantageous to examine keyword frequency or the presence or absence of keywords within a new data item to assist in determining whether a new data item is an anomalous data item and should therefore be flagged.

The statistics for previous data items in the collection are calculated, step 212, and a check is performed to determine whether the new data item lies within N standard deviations of the mean, step 222. The number of standard deviations within the mean, N, may be variably set by the user in order to increase or decrease the sensitivity of the system. For example, setting the value of N to a small number increases the sensitivity of the system and identifies a greater percentage of new data items as anomalous data items. Conversely, where the value of N is a large number, there is a greater chance that the new data item will lie within the set number of standard deviations from the mean and therefore not be recognized as an anomalous data item.

The check performed at step 222 examines each of the values calculated at step 212 to determine if the new data item falls within the defined number of standard deviations from the mean for each calculation. According to some embodiments, where the new data item falls outside the defined number of standard deviations for any of the calculations, the check performed at step 222 returns false. Alternatively, the check performed at step 222 returns false only where the new data item falls outside the defined number of standard deviations for each of the calculations.

Where the check determines that the new data item is within the defined number of standard deviations of the mean, step 222, regardless of which calculations are used to make the determination, the check returns true and the process ends without flagging the new data item as an anomalous data item, step 224. If the check determines that the new data item is outside the defined number of standard deviations of the mean, step 222, regardless of which calculations are used to make the determination, the check returns false and an alert is presented on a display device indicating the new data item is an anomalous data item, step 226. The anomalous data item is flagged, step 226, and the process ends, step 224.

Turning to FIG. 3, an alternative embodiment of a method of operating the system present in FIG. 1 is illustrated. As opposed to the method of operation presented in FIG. 2, the method presented in FIG. 3 periodically calculates statistics for previous data items that comprise a collection, as opposed to the real time calculation in FIG. 2. The process begins when a new data item is received, step 302. The system loads the rules that have been defined to process received data items, step 306. Based on the defined rules that have been retrieved and loaded by the system, a check is performed to determine whether the received data item falls within the scope of one of the loaded rules, step 304. Where no rule is identified with sufficient scope to include the received data item, step 304, no action is taken on the data item, step 308. If a the new data item falls within the scope of a defined rule, the new data item is added or routed to the collection identified by the rule, step 310.

Statistics for previous data items in each collection identified by the defined rules of the system are periodically calculated in a separate process, step 312. The system calculates the mean data item size for the previous data items that have been added to the collection as well as the standard deviation, step 214. The system calculates the mean interval between data items as well as the standard deviation, step 216. The system also calculates the mean data item arrival time and standard deviation for previous data items in the collection, step 218. The system may also calculate other statistics regarding the data items previously in the collection, depending on the type of the data item being analyzed, step 220. These calculated statistics are stored on either a persistent or transient storage device for access by the system as is required.

When a new data item is added to a collection identified by a rule whose scope the data item falls within, step 310, the statistics for the collection are retrieved in order to perform a comparison between the stored statistics for the collection and the new data item, step 322. The check performed at step 324 examines each of the calculated values retrieved at step 322 to determine if the new data item falls within the defined number of standard deviations from the mean for each calculation. According to some embodiments, where the new data item falls outside the defined number of standard deviations for any of the calculations, the check performed at step 324 returns false. Alternatively, the check performed at step 324 returns false only where the new data item falls outside the defined number of standard deviations for each of the calculations. It will be clear to one skilled in the art that other combinations are possible and within the scope of the invention.

Where the check determines that the new data item is within the defined number of standard deviations of the mean, step 324, regardless of which calculations are used to make the determination, the check returns true and the process ends without flagging the new data item as an anomalous data item, step 326. If the check determines that the new data item is outside the defined number of standard deviations of the mean, step 324, regardless of which calculations are used to make the determination, the check returns false and an alert is presented on a display device indicating the new data item is an anomalous data item, step 328. The anomalous data item is flagged, step 328, and the process ends, step 326.

Figure 4:
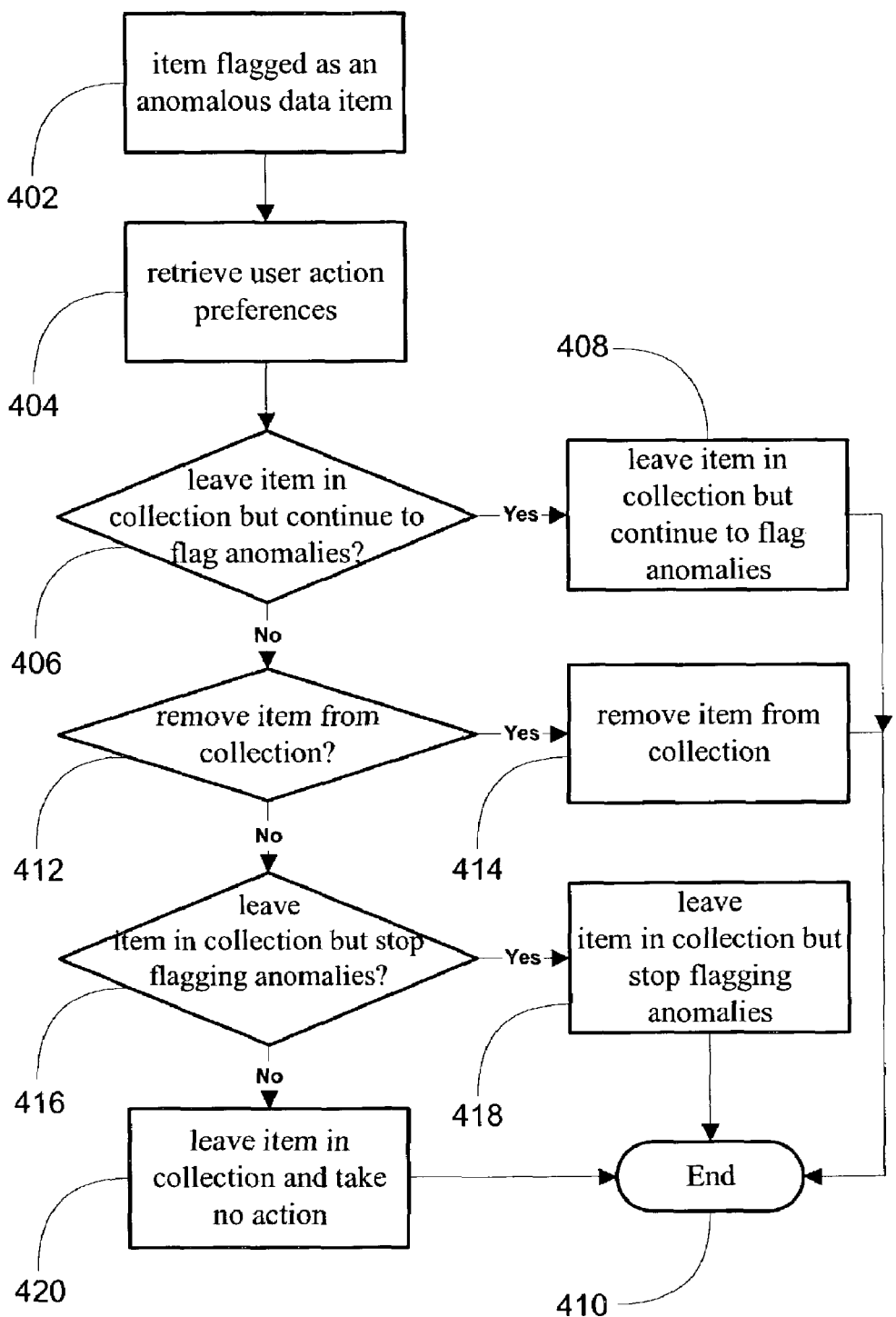
FIG. 4 is a flow diagram presenting a process of using a profile in order to handle archiving and storage of flagged data items according to one embodiment of the present invention.

The present invention may make use of a user profile or similar user preference or preferences in order to handle archiving and storage of flagged data items in an automated fashion. Turning to FIG. 4, the process begins when an item is flagged as an anomalous data item, step 402, for example, by the processes presented in FIGS. 2 and 3. Each user may generate a preference profile indicating how a data item flagged as an anomalous data item is to be handled. Alternatively, preference profiles may be defined for groups of users, e.g., by an administrator. The handling of anomalous data items is ideally performed in an automated fashion so as not to unnecessarily disrupt the user. An anomalous data item is flagged, step 402, and the user's preference profile is retrieved, step 404. It should be noted that the actions that may be identified in a user profile as presented in the present figures are meant to be illustrative, and not limiting. Other automated actions are contemplated and considered within the scope of the invention.

The retrieved preference profile is examined to determine how to handle the anomalous data item. A check is performed to determine if the data item should remain in the present collection while continuing to flag an anomalous data items falling within the collection as defined by the rule, step 406. If the check evaluates to true, e.g., the user's preference profile indicates that this is the proper action to be taken, the an anomalous data item is left in the collection while continuing to use the rule to flag other an anomalous data items placed in the collection, step 408. The action identified by the profile is executed and processing completes, step 410.

Where this check resolves to false, step 406, another check is performed to determine if the profile directs that the an anomalous data item should be removed from the collection, step 412. Where the check evaluates to true, step 412, the an anomalous data item is removed from the collection, step 414, at which point any additional actions may be performed on the data item by the user.

If the check performed at step 412 returns false, program flow continues to step 416. A check is performed, step 416, to determine if the profile retrieved at step 404 indicates that the an anomalous data item should be left in the collection and that no further identified an anomalous data items should be flagged. If true, step 416, the an anomalous data item is left in the collection and no further identified anomalous data items are flagged, step 418, at which point processing is concluded, step 410. Where step 416 evaluates to false, however, processing flows to step 420 where a default action is performed, in this illustration the anomalous data item is left in the collection and no action is taken. The process concludes at step 410.

FIGS. 5a through 5e are a series of screen diagrams presenting user interface cues that may be used to flag an anomalous data item and bring it to the attention of a user, in this example an electronic mail system that includes anomaly detection. As explained above, rules are defined that perform automated operations on a data item that falls within the scope of the rule. FIG. 5a presents an exemplary rule builder interface that may be used to define rules for routing electronic mail messages. The rule builder identifies a name for the category or location 502 that new data items are to be routed to, in this example the category is identified as "WSJ.com". The rule builder is also used to graphically construct the scope of the rule 504 and 506. The graphical interface presents two options for defining the scope of the rule: by sender 504 or by contents 506. The rules builder may also provide other miscellaneous functionality, such as defining how messages should be stored in the category 508. The software stores the rule definition on a persistent or transient storage device.

FIGS. 5b, 5c, and 5d are a series of screen diagrams presenting alert icons indicating when an anomalous data item has been received. The alert icon comprises two parts: a representation identifying the particular category 510 accompanied by a status icon indicating the status of the data items contained within the category 512. According to FIG. 5b, the status icon 512 appears as an empty circle when no new data items have been added to the collection 510 by the rules processor. FIG. 5c, also presenting category identification 510 and status icons, shows a modified status icon 514 indicating that a new data item has been added to the category by the rules processor, but that the data item is not an anomalous data item as identified by the anomaly processor.

FIG. 5d presents a status icon 516 notifying the user that a data item identified as an anomalous data item by the anomaly processor has been added to the collection; although it does fall within the scope of the defined rule, it differs from others in the collection and is therefore an anomalous data item. FIG. 5e is a view showing the contents of the selected collection 518 as organized by the rules processor, indicating a data item that satisfies the rule but is nonetheless an anomalous data item 520 as identified by the anomaly processor. It should be noted that the use of audio cues, as well as the combination of audio and visual cues, to alert a user of a flagged anomalous data item is contemplated as falling within the scope of the invention.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A computerized method for indicating potential misclassification, consequent to the application of at least one first rule, of an incoming data item used by one or more application programs, the method comprising:
   retrieving a user preference profile;
   applying at least one first rule to the incoming data item and adding the incoming data item to a preexisting collection of one or more data items if the incoming data item follows the first rule;
   calculating statistics regarding the data items in the preexisting collection;
   applying one or more second rules to the calculated statistics to identify whether the incoming data item is an anomalous data item that is misclassified and has not properly been added to the preexisting collection despite satisfying the at least one first rule;
   flagging the incoming data item as an anomalous data item if the data item is identified as an anomalous data item; and
   indicating to at least one user, based on the retrieved user preference profile, that the preexisting collection contains at least one data item that has been identified as anomalous with regard to other data items in the preexisting collection.

2. The method of claim 1 wherein calculating comprises calculating a mean data item size and standard deviation for the other data items in the preexisting collection.

3. The method of claim 1 wherein calculating comprises calculating a mean interval between data items and standard deviation for the other data items in the preexisting collection.

4. The method of claim 1 wherein calculating comprises calculating a mean data item arrival time and standard deviation for the other data items in the preexisting collection.

5. The method of claim 1 wherein calculating comprises:
   calculating a presence or absence of keywords for the other data items in the preexisting collection; and
   identifying whether the data item is an anomalous data item based on the presence or absence of keywords.

6. The method of claim 1 wherein calculating statistics for the other data items in the preexisting collection is performed in real time.

7. The method of claim 1 wherein the step of calculating statistics for the other data items is performed periodically.

8. The method of claim 1 wherein identifying comprises determining whether the data item falls outside a number of standard deviations from the statistical calculations.

9. The method of claim 8 comprising setting the number of standard deviations to a value set by a user.

10. Computer readable media storing program code, the program code instructing a programmable computer to execute a method for indicating potential misclassification, consequent to the application of at least one rule, or a data item used by one or more application programs, the method comprising:
retrieving a user preference profile;
applying the at least one rule to add the data item to a preexisting collection of one or more data items;
calculating statistics regarding the data items in the preexisting collection;
applying one or more second rules to the calculated statistics to identify whether the data item is an anomalous data item that is misclassified and has not properly been added to the preexisting collection despite satisfying the at least one first rule;
flagging the data item as an anomalous data item if the data item is identified as an anomalous data item; and
indicating to at least one user, based on in the retrieved user preference profile, that the preexisting collection contains at least one data item that has been identified as anomalous with regard to other data items in the preexisting collection.

11. The computer readable media of claim 10 comprising a method for recognizing and flagging a data item used by one or more application programs as falling within the scope of a rule but anomalous when compared with other data items falling within the scope of the rule wherein calculating comprises calculating a mean data item size and standard deviation for the other data items in the preexisting collection.

12. The computer readable media of claim 10 comprising a method for recognizing and flagging a data item used by one or more application programs as falling within the scope of a rule but anomalous when compared with other data items falling within the scope of the rule wherein calculating comprises calculating a mean interval between data items and standard deviation for the other data items in the preexisting collection.

13. The computer readable media of claim 10 comprising a method for recognizing and flagging a data item used by one or more application programs as falling within the scope of a rule but anomalous when compared with other data items falling within the scope of the rule wherein calculating comprises calculating a mean data item arrival time and standard deviation for the other data items in the preexisting collection.

14. The computer readable media of claim 10 comprising a method for recognizing and flagging a data item used by one or more application programs as falling within the scope of a rule but anomalous when compared with other data items falling within the scope of the rule wherein calculating comprises:
calculating a presence of absence of keywords for other data items in the preexisting collection; and
identifying whether the data item is an anomalous data item based on the presence or absence of keywords.

15. The computer readable media of claim 10 comprising a method for recognizing and flagging a data item used by one or more application programs as falling within the scope of a rule but anomalous when compared with other data items falling within the scope of the rule wherein calculating statistics for other data items in the preexisting collection is performed in real time.

16. The computer readable media of claim 10 comprising a method for recognizing and flagging a data item used by one or more application programs as falling within the scope of a rule but anomalous when compared with other data items falling within the scope of the rule wherein calculating statistics for other data items in the preexisting collection is performed periodically.

17. The computer readable media of claim 10 comprising a method for recognizing and flagging a data item used by one or more application programs as falling within the scope of a rule but anomalous when compared with other data items falling within the scope of the rule wherein identifying comprises determining whether the data item falls outside a number of standard deviations from the statistical calculations.

18. The computer readable media of claim 17 comprising a method for recognizing and flagging a data item used by one or more application programs as falling within the scope of a rule but anomalous when compared with other data items falling within the scope of the rule comprising setting the number of standard deviations to a value set by a user.

19. A computerized method for recognizing and flagging a data item used by one or more application programs as falling within the scope of a rule but anomalous when compared with other data items falling within the scope of the rule, the method comprising:
retrieving a user preference profile;
applying the at least one first rule to add the data item to a preexisting collection of one or more data items;
calculating statistics regarding the data items in the preexisting collection;
applying one or more second rules to the calculated statistics to identify whether the data item is an anomalous data item that is misclassified and has not properly been added to the preexisting collection despite satisfying the at least one first rule;
flagging the data item as an anomalous data item if the data item is identified as an anomalous data item; and
taking an action for the flagged data item as set forth in the retrieved user preference profile.

\* \* \* \* \*